(12) United States Patent
Zhao et al.

(10) Patent No.: US 10,203,928 B2
(45) Date of Patent: Feb. 12, 2019

(54) DISPLAY DEVICE, METHOD AND DEVICE FOR ADJUSTING INFORMATION CHANNELS THEREOF

(71) Applicant: BOE TECHNOLOGY GROUP CO, LTD., Beijing (CN)

(72) Inventors: Tianyue Zhao, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 15/508,642

(22) PCT Filed: Aug. 8, 2016

(86) PCT No.: PCT/CN2016/093956
§ 371 (c)(1),
(2) Date: Mar. 3, 2017

(87) PCT Pub. No.: WO2017/118010
PCT Pub. Date: Jul. 13, 2017

(65) Prior Publication Data
US 2018/0113664 A1    Apr. 26, 2018

(30) Foreign Application Priority Data

Jan. 8, 2016  (CN) .......................... 2016 1 0012347

(51) Int. Cl.
*G06F 3/14*       (2006.01)
(52) U.S. Cl.
CPC .............. *G06F 3/1446* (2013.01); *G06F 3/14* (2013.01); *G09G 2300/026* (2013.01);
(Continued)
(58) Field of Classification Search
CPC ...................... G09G 2300/026; G06F 3/1446
See application file for complete search history.

(56) References Cited

U.S. PATENT DOCUMENTS 7,646,397 B2 * 1/2010 Karaki .................. G06F 3/1446
                                                            345/690
9,792,081 B2 * 10/2017 Fukuhara .............. G06F 3/1446
(Continued)

FOREIGN PATENT DOCUMENTS

CN       101526890 A  *  9/2009
CN       102157141 A      8/2011
(Continued)

OTHER PUBLICATIONS

Search Report and Written Opinion dated Nov. 2, 2016 from State Intellectual Property Office of the P.R. China.
First Chinese Office Action dated Jan. 3, 2018.

*Primary Examiner* — Patrick F Marinelli
(74) *Attorney, Agent, or Firm* — Dilworth & Barrese, LLP; Michael J. Musella, Esq

(57) ABSTRACT

A display device as well as a method and a device for adjusting information channels of the same are disclosed. The adjusting method includes: turning the display device on; transmitting a picture to a display screen (1) of the display device for display, the picture comprising a plurality of sub-pictures in one-to-one correspondence with a plurality of sub-screens (11) which are spliced to form the display screen (1); acquiring an image displayed on the display screen (1); processing the acquired image, comparing the processed image with the picture, and identifying arrangement sequence of a plurality of information channels of the display device; and adjusting the respective information channels such that the image displayed by the display screen (1) is the same as the picture. The adjusting method compares the image displayed on the display screen of the display device with the original picture, identifies and adjusts the respective information channels, so there is no need for viewing the display system for confirmation every
(Continued)

time the line sequence is adjusted, thereby achieving a quick and convenient adjustment.

11 Claims, 8 Drawing Sheets

(52) U.S. Cl.
CPC . *G09G 2330/026* (2013.01); *G09G 2330/027* (2013.01); *G09G 2370/042* (2013.01)

(56) References Cited

U.S. PATENT DOCUMENTS

| | | | | |
|---|---|---|---|---|
| 2006/0028687 A1* | 2/2006 | Karaki | ............. | G06F 3/1446 358/3.01 |
| 2009/0278806 A1* | 11/2009 | Duarte | ............. | G06F 3/0416 345/173 |
| 2010/0033402 A1* | 2/2010 | Yoshida | ............. | G06F 3/1446 345/1.3 |
| 2010/0271286 A1* | 10/2010 | Li | ............. | G06F 3/1446 345/1.3 |
| 2011/0164065 A1* | 7/2011 | Mate | ............. | G06F 3/1446 345/676 |
| 2015/0279037 A1* | 10/2015 | Griffin | ............. | G06F 3/1446 345/1.3 |
| 2016/0070522 A1* | 3/2016 | Kaneko | ............. | G06F 3/1446 345/2.3 |
| 2016/0139867 A1* | 5/2016 | Cha | ............. | G06F 3/1423 348/383 |
| 2016/0155389 A1* | 6/2016 | Beon | ............. | G09G 3/3406 345/690 |
| 2016/0162240 A1* | 6/2016 | Gu | ............. | H04N 21/4402 345/1.3 |
| 2016/0328202 A1* | 11/2016 | Ritter | ............. | G06F 3/1431 |
| 2016/0329030 A1* | 11/2016 | Lee | ............. | G06F 3/1446 |

FOREIGN PATENT DOCUMENTS

| | | | | |
|---|---|---|---|---|
| CN | 105336289 A | 2/2016 | | |
| CN | 105468326 A | 4/2016 | | |
| EP | 2037352 A2 * | 3/2009 | ......... | G06F 3/0412 |
| JP | 2013064802 A | 4/2013 | | |
| WO | WO 2017071374 A1 * | 5/2017 | ............. | G09G 3/20 |

* cited by examiner

DISPLAY DEVICE, METHOD AND DEVICE FOR ADJUSTING INFORMATION CHANNELS THEREOF

FIELD OF THE ART

Embodiments of the disclosure relate to the field of display technologies, more particularly, to a display device as well as a method and a device for adjusting information channels of the same.

BACKGROUND

Currently, a multi-screen splice display system splices multiple sub-screens. Taking a 3 by 3 splice sub-screens as an example, the display system comprises nine splice sub-screens and nine display interfaces. If the line sequence between the display interfaces is erroneous during an assembly procedure, an image displayed by the display system will be spliced mistakenly. Moreover, it needs to change and adjust the line sequence when the image displayed by the display system is spliced mistakenly due to the erroneous line sequence. However, a conventional line sequence adjusting method needs to view the image displayed by the display system for confirmation every time the line sequence is adjusted, which makes the adjustment inconvenient.

SUMMARY

Embodiments of the disclosure provide a display device as well as a method and a device for adjusting information channels of the display device.

In first aspect of the disclosure, it is provided a method for adjusting information channels of a display device. The adjusting method comprises: turning the display device on; transmitting a picture to a display screen of the display device for display, the picture comprising a plurality of sub-pictures in one-to-one correspondence with a plurality of sub-screens which are spliced to form the display screen; acquiring an image displayed on the display screen; processing the acquired image, comparing the processed image with the picture, and identifying arrangement sequence of a plurality of information channels of the display device; and adjusting the respective information channels such that the image displayed by the display screen is the same as the picture.

In second aspect of the disclosure, it is provided a device for adjusting information channels of a display device, comprising: a power control module, connected to the display device and configured to turn the display device on; a picture transmitting module, connected to the display device and configured to transmit a picture to a display screen of the display device for display, the picture comprising a plurality of sub-pictures in one-to-one correspondence with a plurality of sub-screens of the display screen; an image acquisition module for acquiring an image displayed on the display screen; an image processing module, connected to the image acquisition module and configured to process the acquired image and to compare the processed image with the picture, and identifying arrangement sequence of a plurality of information channels of the display device; and an adjusting module, wherein one of two ends of the adjusting module is connected to the image processing module and the other end is connected to the display device, and the adjusting module is configured to adjust the respective information channels such that the image displayed by the display screen is the same as the picture.

In third aspect of the disclosure, it is provided a display device comprising: a display screen comprising a plurality of sub-screens; a plurality of information channels in one-to-one correspondence with the plurality of sub-screens; at least one camera configured to capture an image displayed on the display screen; an editable module, wherein one of two ends of the editable module is connected to the at least one camera, and the other end is connected to the display device; the editable module is configured to receive the image captured by the at least one camera, compare the received image and an image to be displayed, and adjusting the respective information channels according to a comparison result, such that the image displayed by the display screen is the same as the image to be displayed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some of embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiments of the disclosure provide a display device as well as a method and a device for adjusting information channels of the same. The display device realizes automatic adjustment of information channels by using a camera to capture image information displayed by a display screen and by using an editable module to perform image processing and comparison. As a result, the above display device can adjust display channels automatically and conveniently.

The above display screen may be a double-side transparent display screen, or a single-side liquid crystal display screen.

Figure 1:
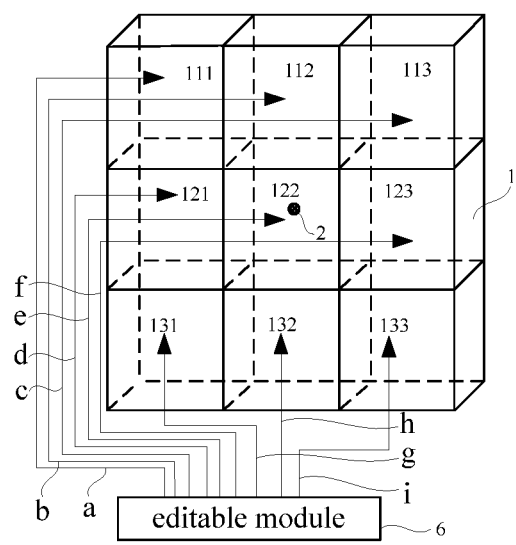
FIG. 1 schematically illustrates a configuration of a display device in accordance with an embodiment of the disclosure.
Figure 2:
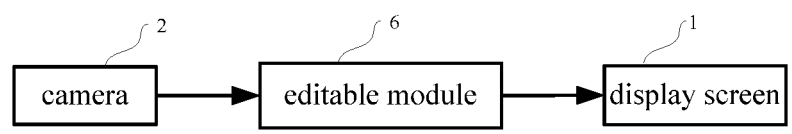
FIG. 2 is a schematic diagram of a display device in accordance with another embodiment of the disclosure.
Figure 3:
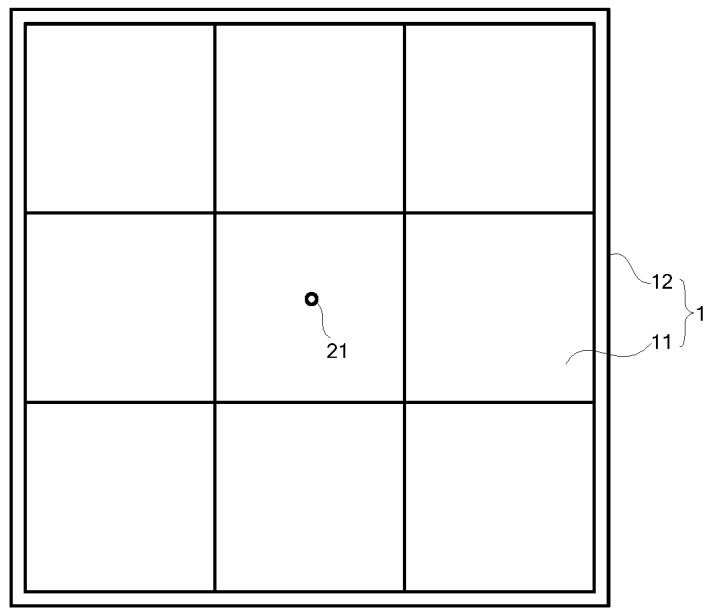
FIG. 3 schematically illustrates a display device provided with a camera in accordance with an embodiment of the disclosure.
Figure 4:
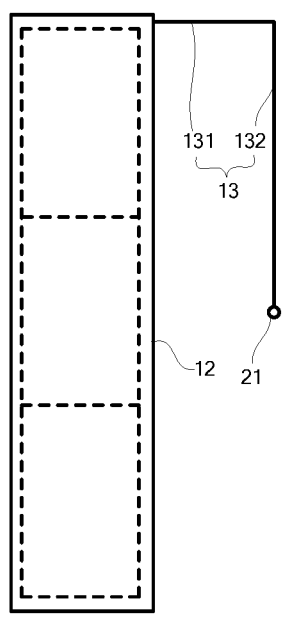
FIG. 4 is a right side view of the configuration illustrated in FIG. 3.
Figure 5:
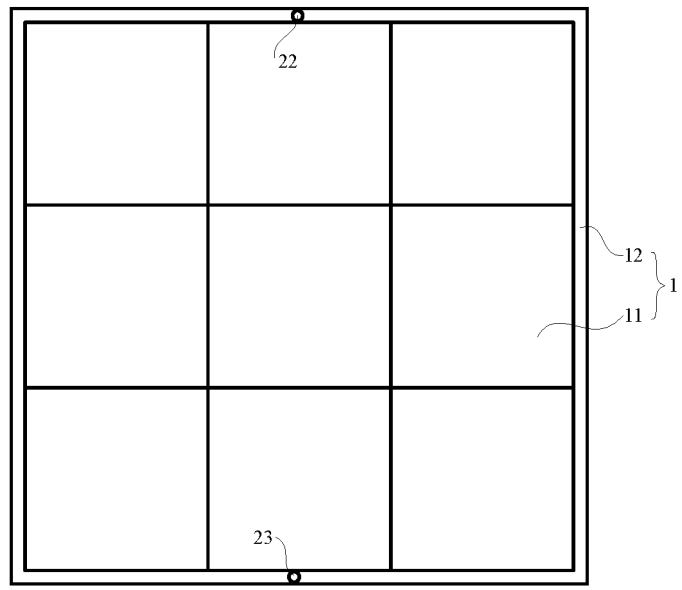
FIG. 5 schematically illustrates a display device provided with two cameras in accordance with an embodiment of the disclosure.
Figure 6:
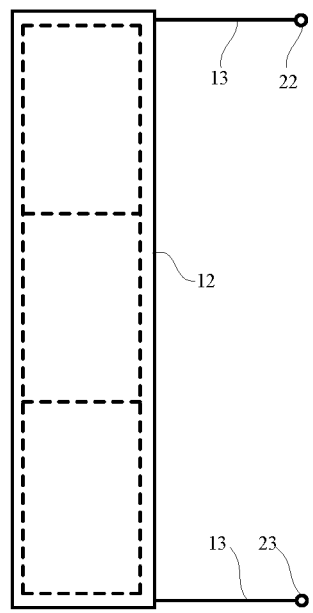
FIG. 6 is a right side view of the configuration illustrated in FIG. 5.
Figure 7:
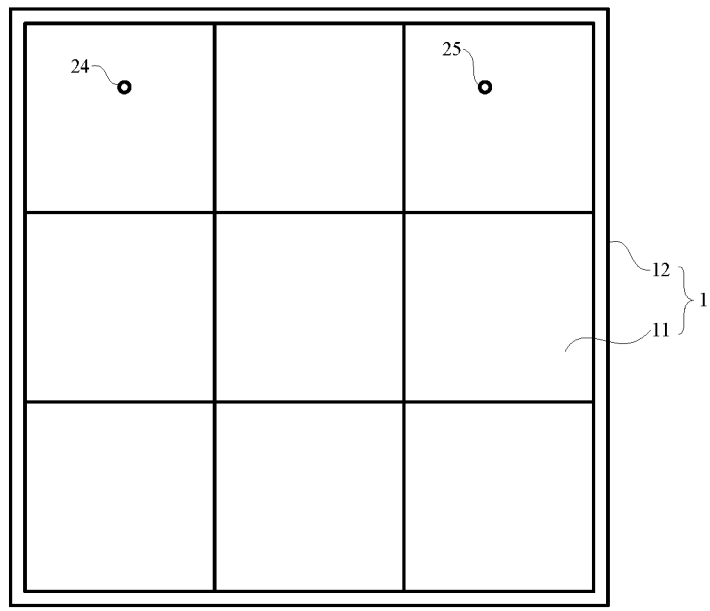
FIG. 7 schematically illustrates a display device provided with two cameras in accordance with another embodiment of the disclosure.
Figure 8:
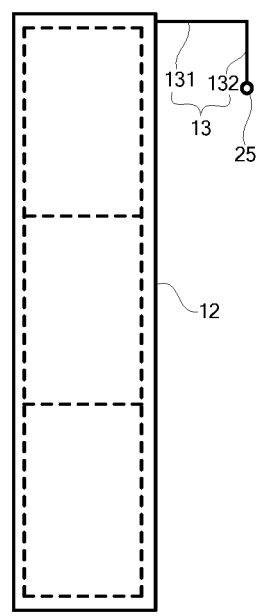
FIG. 8 is a right side view of the configuration illustrated in FIG. 7.
Figure 9:
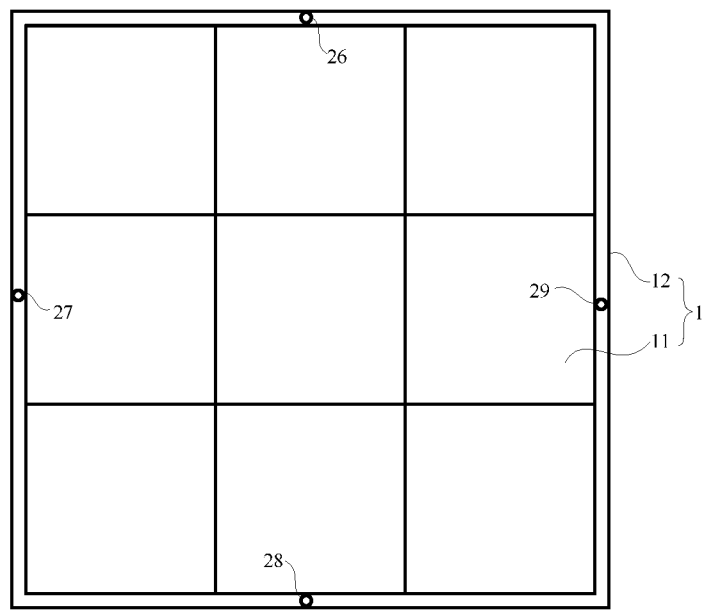
FIG. 9 schematically illustrates a display device provided with four cameras in accordance with an embodiment of the disclosure.
Figure 10:
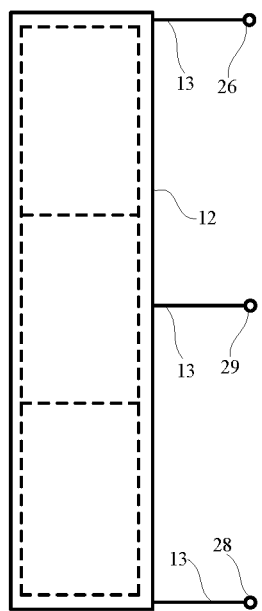
FIG. 10 is a right side view of the configuration illustrated in FIG. 9.

With reference to FIGS. 1 and 2, an embodiment of the disclosure provides a display device comprising: a display screen 1 which comprises a plurality of sub-screens 11, a plurality of information channels in one to one correspondence with the respective sub-screens 11, and at least one camera 2. The camera may be a camera 21 as illustrated in FIGS. 3 and 4, a camera 22 and a camera 23 as illustrated in FIGS. 5 and 6, a camera 24 and a camera 25 as illustrated in FIGS. 7 and 8, or a camera 26, 27, 28 and 29 as illustrated in FIGS. 9 and 10. The camera 2 is configured to capture image information displayed on the whole display screen 1. The display device further comprises an editable module 6, one end of which is connected to the camera 2, and the other end is connected to the display screen 1. The editable module 6 is configured to receive an image captured by the camera 2, to compare the received image with a preset picture stored in advance, and to adjust the respective information channel according to a comparison result, such that the respective sub-screens 11 of the display screen 1 display the preset picture.

When the above display device is used, the editable module 6 may compare the image captured by the camera 2 with the preset picture which is stored in advance, and then adjust the information channels of the respective sub-screens 11 according to the comparison result, such that the respective sub-screens 11 of the display screen 1 display the preset picture.

The display device captures the image information displayed by the display screen through the at least one camera provided therewith, and then transmit the image information displayed by the display screen and captured by the camera to the editable module. After receiving the image information displayed by the display screen and captured by the camera, the editable module compares the received image information captured by the camera with the preset picture which is stored in advance, and then adjust the information channels according to the comparison result, such that information displayed by the respective sub-screens in the display screen forms the preset picture. In this way, the display device may realize automatic adjustment of the information channels by way of the camera and the editable module, with no need for viewing the display system for confirmation every time the line sequence is adjusted. Therefore, the display device can adjust the display channels automatically and conveniently.

Still referring to FIGS. 1 and 2, an example of a display screen 1 with nine sub-screens 11 arranged into a 3 by 3 array is described. The display screen 1 has nine sub-screens 11. For example, there are a first sub-screen 111, a second sub-screen 112, a third display screen 113, a fourth display screen 121, a fifth display screen 122, a sixth display screen 123, a seventh display screen 131, an eighth display screen 132, and a ninth display screen 133. Nine information channels in one to one correspondence with the nine sub-screens are an information channel a, an information channel b, an information channel c, an information channel d, an information channel e, an information channel f, an information channel g, an information channel h and an information channel i. As illustrated in FIG. 1, an editable module 6 is connected to the nine sub-screens 11 via the nine information channels. As an example, the editable module 6 is connected to the first sub-screen 111 via the information channel a; the editable module 6 is connected to the second sub-screen 112 via the information channel b; the editable module 6 is connected to the third sub-screen 113 via the information channel c; the editable module 6 is connected to the fourth sub-screen 121 via the information channel d; the editable module 6 is connected to the fifth sub-screen 122 via the information channel e; the editable module 6 is connected to the sixth sub-screen 123 via the information channel f; the editable module 6 is connected to the seventh sub-screen 131 via the information channel g; the editable module 6 is connected to the eighth sub-screen 132 via the information channel h; and the editable module 6 is connected to the ninth sub-screen 133 via the information channel i.

Figure 11:
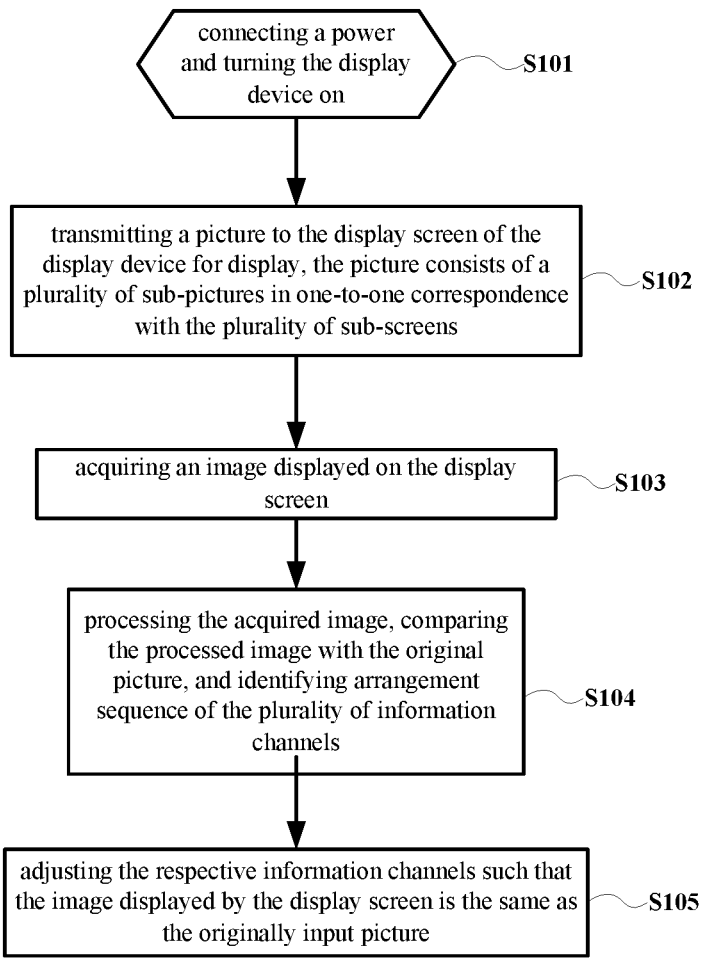
FIG. 11 is a flow chart of a method for adjusting information channels of a display device in accordance with an embodiment of the disclosure.
Figure 12:
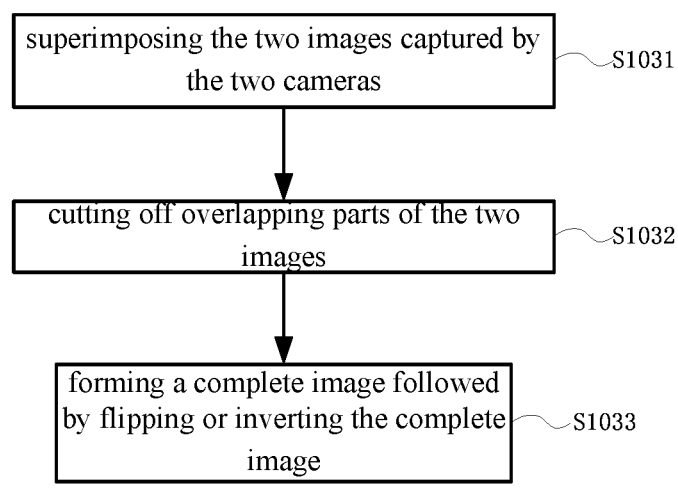
FIG. 12 is a flow chart of an image processing procedure in the flow chart of FIG. 11.

A method for adjusting information channels of a display device by using the above device is provided according to an embodiment of the disclosure. With reference to FIGS. 11 and 12, the adjusting method comprises the following steps:

Step S101: connecting a power and turning the display device on (that is, power on the display device);

Step 102: transmitting a picture to the display screen 1 of the display device for display, the picture consists of a plurality of sub-pictures in one-to-one correspondence with the plurality of sub-screens 11 spliced to form the display screen 1;

Step 103: acquiring an image displayed on the display screen; for example the camera 2 provided to the display device is configured for capturing the image;

Step 104: processing the acquired image, comparing the processed image with the original picture, and identifying arrangement sequence of the plurality of information channels; for example, the camera 2 acquires the image displayed on the display screen 1 and then transmits the same to the editable module 6; the editable module 6 processes the obtained image and compares the processed image with the original picture, so as to identify the arrangement sequence of the plurality of information channels;

Step 105: adjusting the respective information channels such that the image displayed by the display screen 1 is the same as the originally input picture; as an example, the editable module 6 identifies the arrangement sequence of the respective information channels according to the image comparison result and then adjusts the respective information channels.

The above adjusting method processes the acquired image which is displayed on the display screen, then compares the processed image with the original picture, identifies the arrangement sequence of the respective information channels, and then adjusts the respective information channels, such that the image displayed on the display screen is consistent with the originally input picture. Therefore, the adjusting method compares the acquired image which is displayed on the display screen and the original picture to identify the arrangement sequence of the respective information channels and then to adjust the respective information channels; with no need for viewing the display system for confirmation every time the line sequence is adjusted. Therefore, the display device can adjust the display channels automatically and conveniently.

As illustrated in FIG. 1, during the procedure of adjusting the information channels of the display device in the above adjusting method, first the power is turned on such that the display device is turned on. Then the picture is transmitted to the display screen 1 of the display device for display. For the convenience of identifying the information channels of the display device, the picture is partitioned into nine sub-pictures in one-to-one correspondence with the nine sub-screens 11 of the display screen 1. Then at least one camera 2 is configured to capture image information displayed by the whole display screen 1, the image information is then transmitted to the editable module 6 for processing. Finally, the image processed by the editable module 6 is compared with the transmitted picture, and the arrangement sequence of the information channels is identified according to the comparison result. Then the information channels are adjusted to allow the image information displayed by the sub-screens 11 of the display screen to tile to be consistent with the originally input picture.

Therefore, the above display device can realize automatic adjustment of the information channels by way of the camera 2 and the editable module 6, with no need for viewing the display system for confirmation every time the line sequence is adjusted. Therefore, the display device can adjust the display channels automatically and conveniently.

Figure 13:
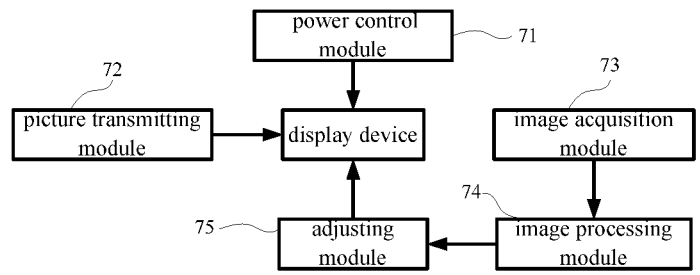
FIG. 13 is a schematic diagram of a device for adjusting information channels of a display device in accordance with an embodiment of the disclosure.

Based on the method for adjusting information channels, an embodiment of the disclosure further provides a device for adjusting information channels of a display device. As illustrated in FIG. 13, the adjusting device comprises a power control module 71, a picture transmitting module 72, an image acquisition module 73, an image processing module 74 and an adjusting module 75. The power control module 71 is connected to the display device and configured to connect a power and turn the display device on. The picture transmitting module 72 is connected to the display device and configured to transmit a picture to the display screen 1 for display, the picture consists of a plurality of sub-pictures in one-to-one correspondence with a plurality of sub-screens 11 of the display screen 1. The image acquisition module 73 is configured for acquiring an image displayed on the display screen 1. The image processing module 74 is connected to the image acquisition module and configured to process the acquired image and to compare the processed image with the original picture, and to identify arrangement sequence of a plurality of information channels of the display device. One end of the adjusting module 75 is connected to the image processing module and the other end is connected to the display device, and configured for adjusting the respective information channels such that the image displayed by the display screen is the same as the picture.

In at least some of embodiments, the editable module 6 of the display device is a Field Programmable Gate Array (FPGA), a Digital Signal Processor (DSP), a programmable logic controller (PLC) or a micro-processor. The editable module 6 may also be other control module.

In at least some of embodiments, the display device further comprises a support 12 for supporting the sub-screens 11, the at least one camera 2 is mounted on the support 12, as illustrated in FIGS. 3 to 10.

As an example, with reference to FIGS. 3 and 4, the display device has only one camera 21, and the camera 21 is mounted on the support 12 of the display screen 1 along a direction facing the sub-screens 11 and configured to capture image information of the whole display screen 1.

In at least some of embodiments, when the display screen 1 of the above display device is transparent screen, a capturing direction of the camera 21 faces the sub-screens 11, the camera 21 is mounted on the support 12 of the display screen 1, the camera 21 captures image information displayed on the whole display screen 1 from the front or back of the sub-screens 11.

In at least some of embodiments, when the camera 21 is configured to capture the image information displayed on the whole display screen 1, the camera 21 extends to outside the display device for capturing images through a retractable rod 13. The retractable rod 13 may be a multiple segment structure. For example, as illustrated in FIG. 4, when needed, the retractable rod 13 comprises a first retractable rod 131 and a second retractable rod 132 hinged together, such that the camera 21 not only extends out of the display device, but also extends to a central position of the display device. Moreover, when it does not need the camera 21 to acquire the image information displayed on the display screen, the camera may also retract back into the support 12 of the display screen 1 by way of the retractable rod 13.

In at least some of embodiments, when the number of sub-screens 11 of the display screen 1 is relatively large, for example, the display screen 1 comprises 100 sub-screens 11, the size of the display screen 1 is also relatively large. In this case, for the purpose of conveniently capturing the image information on the display screen 1 via the camera 2, a slide rail may be mounted on the support 12 of the display screen 1, and a slide block, which is fitted to and is movable along the slide rail, is provided on the slide rail. The camera 2 is mounted on the slide block and driven to move along the support 12 of the display screen 1 under the action of the slide rail together with the slide block, such that the camera 2 can capture the image displayed on the whole display screen 1, and the information channels can be adjusted by the editable module 6 after the image information displayed on the display screen 1 is acquired. It can be contemplated that the camera 2 may be mounted on the slide block indirectly, for example, one or more retractable rods are mounted on the slide block, and the camera is mounted an end of the retractable rod.

As illustrated in FIGS. 3 and 4, a projection of the camera 21 on the display screen 1 is located at the center of the display screen 1 and the camera 21 is 360 degree rotatable. As a result, when the camera 21 is used to capture the image displayed on the display screen 1, the camera 21 rotates in 360 degrees (when capturing image), so as to capture the image displayed on the display screen 1 completely. When the display screen 1 is transparent screen, the camera 1 may capture the displayed image from the back of the screen. However, the captured image is inversed relatively to the actually displayed image. When the image is processed by the editable module 6, the captured image has to be flipped or inversed, so as to reflect the image information actually displayed on the display screen 1, which will make the comparison with the input picture more convenient.

In at least some of embodiments, the display device has a plurality of camera 2. For example, a display device as illustrated in FIG. 5 has two cameras 22 and 23, a display device as illustrated in FIG. 7 has two cameras 24 and 25. The following description will refer to FIGS. 5 and 6. As illustrated in FIG. 12, in the above method for adjusting information channels of a display device, the following steps may be used to process images captured by the camera 22 and the camera 23.

Step S1031: superimposing the images captured by the camera 22 and the camera 23.

As illustrated in FIG. 5, the display screen 1 comprises three rows of sub-screens 11 arranged along a direction from the camera 22 to the camera 23. When the camera 22 and the camera 23 are used to capture the image displayed on the display screens, the camera 22 captures an image displayed on the two row of sub-screens 11 which are closer to camera 22 (that is, the first and second rows of sub-screens), while the camera 23 captures an images displayed on the two row of sub-screens 11 which are closer to camera 23 (that is, the second and third rows of sub-screens). After capturing is finished, the two images captured by the camera 22 and the camera 23 are spliced by the editable module 6 in such a way that the identical portion of the two images are superimposed at the middle of the display screen. The superimposing may be considered as jointing the two images in overlapping manner to form a picture of the same size as the display screen. During the superimposing, multiple characterization points are extracted by an image processing method, the characterization points of the acquired image are then matched with the characterization points of the preset picture. The matching process includes enlarge or rotate the picture, such that the corresponding characterization points of each image have the same position relationship, and the characterization points of the images have the same position relationship under the same coordinate system, the images are superimposed this way.

Step S1032: cutting off overlapping parts of the two images.

After superimposing the images captured by the camera 22 and the camera 23 by the editable module 6, both images captured by the camera 22 and the camera 23 include the image displayed by the middle row (that is, the second row of sub-screens). Therefore, when the two pictures are superimposed, there are overlapping parts in the middle row of the sub-screens 11. Thus, the image displayed in the middle row of sub-screens 11 is cut from one of the images, such that the two images captured by the camera 22 and the camera 23 are spliced to form a complete image. When cutting is performed, one of images is taken as a reference image and the other image is a processed image. Each of all pixels in the processed image needs to determine whether the pixel is present in the reference image. If yes, the pixel in the processed image is removed; otherwise, it is kept.

When the display screen is transparent screen, the camera 22 and the camera 23 captures the image displayed on the display screen 1 from the front or back thereof. When the camera 22 and the camera 23 capture the displayed images from the front of the display screen 1, the images captured by the cameras are the same as the actually displayed images, the complete image formed after superimposing is compared with the originally input image directly.

Step S1033: forming a complete image followed by flipping or inverting the complete image.

Figure 14:
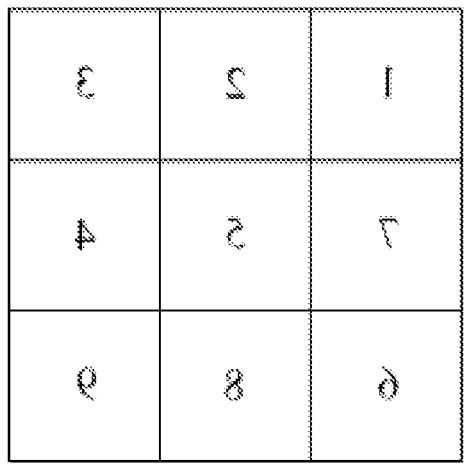
FIG. 14 is image information displayed on a display screen captured by a camera when information channels of the display device in accordance with an embodiment of the disclosure are connected to sub-screens mistakenly.
Figure 15:
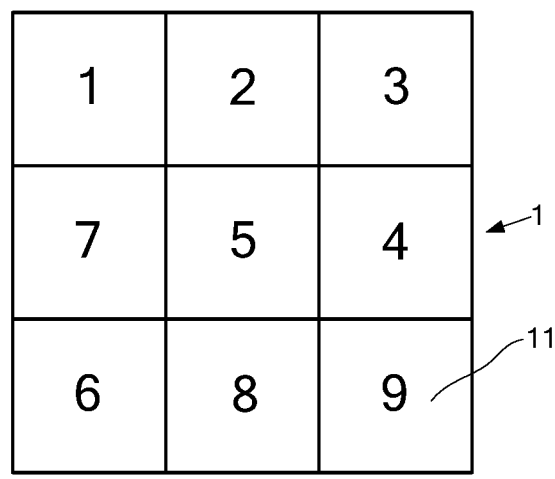
FIG. 15 schematically illustrates a displayed image in accordance with an embodiment of the disclosure when information channels of the display device are connected to the sub-screens mistakenly.

When the display screen 1 is transparent screen and the camera is disposed at the back of the display screen, the image captured by the camera 2 is inversed relatively to the image actually displayed by the display screen 1. An image captured by the camera 2 as illustrated in FIG. 14 is horizontally symmetrical to the image displayed by the display screen 1 as illustrated in FIG. 15. Therefore, when the image is captured from the back of the display screen 1, the images captured by the camera 2 have to be inversed. It can be contemplated that when capturing directions of the multiple cameras used to capture the images are opposite, the capturing directions may be reversed first, such that the capture directions of the images are the same. The images are then processed and cut.

In at least some of embodiments, in the step S102 of transmitting a picture by the picture transmitting module 72 to the display screen 1 for display, the example of nine sub-screens 11 forming a 3 by 3 array structure is referred to, and the display device further has nine information channels in one-to-one correspondence with the nine sub-screens 11. The picture transmitted by the picture transmitting module 72 may be a preset picture. The preset picture may be a specific picture designed for the splice number of the sub-screens, for example, for the nine sub-screens 11 of the display screen 1. Moreover, to identify the information channels in a simple and quick way, the specific picture is labeled with a white background and black font patterns marked with numerals "1, 2, 3, 4, 5, 6, 7, 8, 9" sequentially, according to the arrangement sequence of the nine sub-screens 11 of the display screen 1. The specific picture is divided into nine sub-pictures in one-to-one correspondence with the nine sub-screens 11 according to the arrangement sequence of the nine sub-screens 11 of the display screen 1. Each sub-picture is marked with a corresponding numeral pattern. For example, in the display screen 1, the three sub-screens 11 on the first row of the display screen 1 are marked with "1, 2, 3" sequentially from the left to right, the three sub-screens 11 on the second row of the display screen 1 are marked with "4, 5, 6" sequentially from the left to right; and the three sub-screens 11 on the third row of the display screen 1 are marked with "7, 8, 9" sequentially from the left to right. Moreover, the information channels connected to the nine sub-screens in one-to-one correspondence has the order number "1, 2, 3, 4, 5, 6, 7, 8, 9" sequentially.

Figure 16:
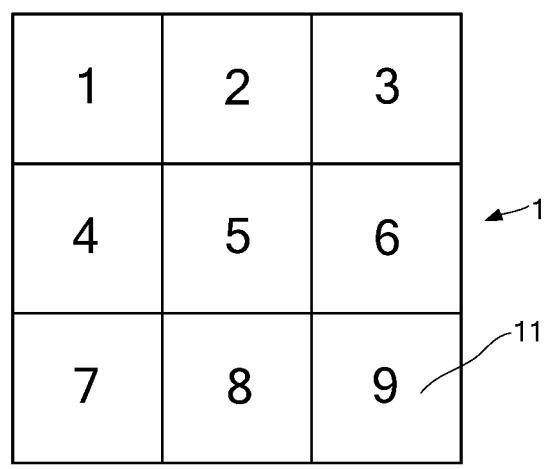
FIG. 16 is image information displayed on a display screen after the information channels of FIG. 14 are adjusted such that the information channels are connected to sub-screens correctly.

As illustrated in FIG. 16, when each information channel and each sub-screen 11 correspondent to each other one by one and are connected correctly, the sub-screen 11 with the order number of 1 displays the sub-picture with the numeral "1", the sub-screen 11 with the order number of 2 displays the sub-picture with the numeral "2", and so on. The sub-screen 11 with the order number of 9 displays the sub-picture with the numeral "9".

When the display screen 1 is transparent screen and the information channels and the sub-screens 11 are connected mistakenly, the image captured from the back of the display screen 1 by the camera 2 is illustrated in FIG. 14. By comparing to the image information displayed on the display screen 1 as illustrated in FIG. 15, it is known that the image information of FIG. 14 is mirror symmetrically to the actually displayed image information of FIG. 15. Therefore, the editable module 6 is used to invert the image captured by the camera 2, the inverted image information is consistent with the image shown in FIG. 15. By comparing the image processed by the editable module 6 and the originally input picture, it is seen that the sub-screen 11 with the order number of 4 displays the sub-picture with the numeral "7", thus the sub-screen 11 with the order number of 4 is connected to the wrong information channel. Similarly, the sub-screens 11 with the order number of 6 and 7 are also connected to the wrong information channel and therefore need to be adjusted. The input signals, which are input to the information channels connected to the sub-screens 11 with the order number of 4, 6 and 7, need to be adjusted accordingly. That is, the input signal of the information channel connected to the sub-screen 11 with the order number of 4 needs to be adjusted as the sub-picture with the numeral "4", the input signal of the information channel connected to the sub-screen 11 with the order number of 6 needs to be adjusted as the sub-picture with the numeral "6", and the input signal of the information channel connected to the sub-screen 11 with the order number of 7 needs to be adjusted as the sub-picture with the numeral "7". In this case, it needs only to adjust input signals of the wrongly connected information channels, without the need of reconnected each information channels.

During the adjustment, the image information of the splice display screen 1 captured by the camera 2 is processed by the editable module 6 and then the editable module 6 compares the processed image with the originally input picture, to determine the position of the information channels which output the wrong signals. A DDR (data storage) may be also used to adjust the input position information of the information channels, such that the input information of the information channels is in one-to-one correspondence with the positions of the sub-screens 11. In a real circuit, a relay module may also be used to control swapping of the information channels. An output terminal of the editable module 6 is connected to a control terminal of the relay module, the information channels are connected to input terminals of the relay module, an output terminal of the relay module is connected to the display screen 1. The signal output by the editable module 6 is used to control the operation of the relay module, such that the relay in the relay module is turned on/off, thereby realizing swapping of the information channels. When data is read out, the partitioned sub-pictures are re-arranged and output according to instructions. The correct image after the adjustment is illustrated in FIG. 16. During actual connection procedures, when other sub-screens 11 are connected to the information channels wrongly, the adjusting method is the same.

The editable module 6 is configured to receive the image captured by the camera and to compare the received image with the preset picture. During comparison, the sub-images displayed by the respective display screens 11 and captured by the camera 2 are compared with the preset correct sub-pictures directly. For the convenience of description, it is assumed that the sub-image displayed by the first sub-screen is wrong, and the sub-image displayed by the second sub-screen should be displayed on the first sub-screen. That is, when the editable module 6 determines that the first sub-screen displays the wrong sub-image, and the sub-image displayed by the second sub-screen should be the correct sub-image to be displayed on the first sub-screen, the editable module may make the sub-image transmitted to the second sub-screen to be transmitted to the first sub-screen, thereby realizing the adjustment of the information channels of the first and second sub-screens.

In at least some of embodiments, the specific picture may be a picture with a simple pattern, for example, a picture with a rectangle or a circle. A size of the rectangle and circle is adapted to the size of the splice screen 1, allowing sub-screens 11 other than the central sub-screen to have images with different patterns, so as to facilitate the distinguishing between the information channels of the respective sub-screens, making the adjustment easier and faster.

In at least some of embodiments, when there are many sub-screens, they may be processed block by block. During the processing, the display screen is first partitioned into different blocks, and then the information channels are adjusted by processing each block.

In at least some of embodiments, to capture the image displayed on the display screen 1 more clearly and more accurately, the position of the camera 2 is configured as needed. For example, the display device of FIGS. 5 and 6 mounts the camera 22 on an upper edge of the support 12 and mounts the camera 23 on an lower edge of the support 12; the display device of FIGS. 7 and 8 mounts both the camera 24 and the camera 25 on an upper edge of the support 12. Multiple cameras 2 may also be configured in the display device. As illustrated in FIGS. 9 and 10, four cameras 2 are respectively disposed on all four edges of the support 12 of the display device, which are the camera 26, the camera 27, the camera 28 and the camera 29. Moreover, when the cameras 26, 27, 28 and 29 are used to capture the information displayed on the display screen 1, to achieve better capturing effect, the four cameras are all connected to the support 12 through retractable rods 13.

Moreover, the display screen is not limited to the above 3 by 3 array structure, it may also be a 4 by 4, 4 by 4, 5 by 5 array structure or other structures.

In an actual operation, the above adjusting method may be performed in real time. Once it is found that the displayed image is inconsistent with the preset picture, the adjusting method is performed. It may also adjust the information channels every time the display device is powered on. Or else, adjustment may also be performed after accidental blackout.

What is described above is related to the illustrative embodiments of the disclosure only and not limitative to the scope of the disclosure; the scopes of the disclosure are defined by the accompanying claims.

The present application claims priority from Chinese Application No. 201610012347.7, filed on Jan. 8, 2016, the disclosure of which is incorporated herein by reference in its entirety.

What is claimed is:

1. A method for adjusting information channels of a display device, comprising:
   turning the display device on;
   transmitting a picture to a display screen of the display device for display, the picture comprising a plurality of sub-pictures in one-to-one correspondence with a plurality of sub-screens which are spliced to form the display screen;
   acquiring an image displayed on the display screen;
   processing the acquired image, comparing the processed image with the picture, and identifying arrangement sequence of a plurality of information channels of the display device; and
   adjusting the respective information channels such that the image displayed by the display screen is the same as the picture,
   wherein the step of acquiring an image displayed on the display screen comprises capturing the image displayed on the display screen from a back of the display screen by using at least one camera, wherein the display screen is transparent screen, and
   in condition that a plurality of cameras are used to capture the image displayed on the display screen, the step of processing the acquired image comprising superimposing a plurality of images captured by the plurality of cameras, cutting overlapping parts of the plurality of images, and forming a complete image followed by flipping or inverting the complete image.

2. The adjusting method of claim 1, wherein the picture consists of a same number of sub-pictures as the number of the sub-screens.

3. The adjusting method of claim 1, wherein the step of superimposing a plurality of images captured by the plurality of cameras comprising:
jointing the plurality of images in overlapping manner to form a picture of a same size as the display screen.

4. A device for adjusting information channels of a display device, comprising:
a power control module, connected to the display device and configured to turn the display device on;
a picture transmitting module, connected to the display device and configured to transmit a picture to a display screen of the display device for display, the picture comprising a plurality of sub-pictures in one-to-one correspondence with a plurality of sub-screens of the display screen;
an image acquisition module for acquiring an image displayed on the display screen;
an image processing module, connected to the image acquisition module and configured to process the acquired image and to compare the processed image with the picture, and identifying arrangement sequence of a plurality of information channels of the display device; and
an adjusting module, wherein one of two ends of the adjusting module is connected to the image processing module and the other end is connected to the display device, and the adjusting module is configured to adjust the respective information channels such that the image displayed by the display screen is the same as the picture,
wherein the image acquisition module comprises at least one camera, the at least one camera captures the image displayed on the display screen from the back of the display screen, and the display screen is transparent screen, and
wherein the image acquisition module comprises a plurality of cameras; the image processing module is configured to superimpose a plurality of images captured by the plurality of cameras, to cut overlapping parts of the plurality of images, and to form a complete image followed by flipping or inverting the complete image.

5. A display device comprising:
a display screen comprising a plurality of sub-screens;
a plurality of information channels in one-to-one correspondence with the plurality of sub-screens;
the display device further comprising:
at least one camera configured to capture an image displayed on the display screen;
an editable module, wherein one of two ends of the editable module is connected to the at least one camera, and the other end is connected to the display device; the editable module is configured to receive the image captured by the at least one camera, compare the received image and an image to be displayed, and adjusting the respective information channels according to a comparison result, such that the image displayed by the display screen is the same as the image to be displayed,
wherein the display screen is transparent screen, and the at least one camera is configured to capture the image displayed on the display screen from the back of the display device,
wherein the at least one camera comprises a plurality of cameras, and
wherein the editable module is configured to superimpose a plurality of images captured by the plurality of cameras, to cut overlapping parts of the plurality of images, and to form a complete image followed by flipping or inverting the complete image.

6. The display device of claim 5, wherein the editable module is a Field Programmable Gate Array (FPGA), a Digital Signal Processor (DSP), a programmable logic controller (PLC) or a microprocessor.

7. The display device of claim 5, further comprising a support for supporting the sub-screens, the at least one camera is mounted on the support.

8. The display device of claim 5, wherein a projection of the at least one camera on the display screen is in a center of the display screen and the at least one camera is 360 degree rotatable.

9. The display device of claim 7, wherein the at least one camera is mounted on the support via a retractable rod.

10. The display device of claim 9, wherein the retractable rod is plural and rods neighboring each other are hinged.

11. The display device of claim 7, wherein a slide rail and a slide block which is moveable along the slide rail are fixed on the support, the at least one camera is mounted on the slide block directly or indirectly.

* * * * *